Aug. 7, 1951     J. A. POTTER     2,563,486
VOLTAGE REGULATOR
Filed Dec. 24, 1949
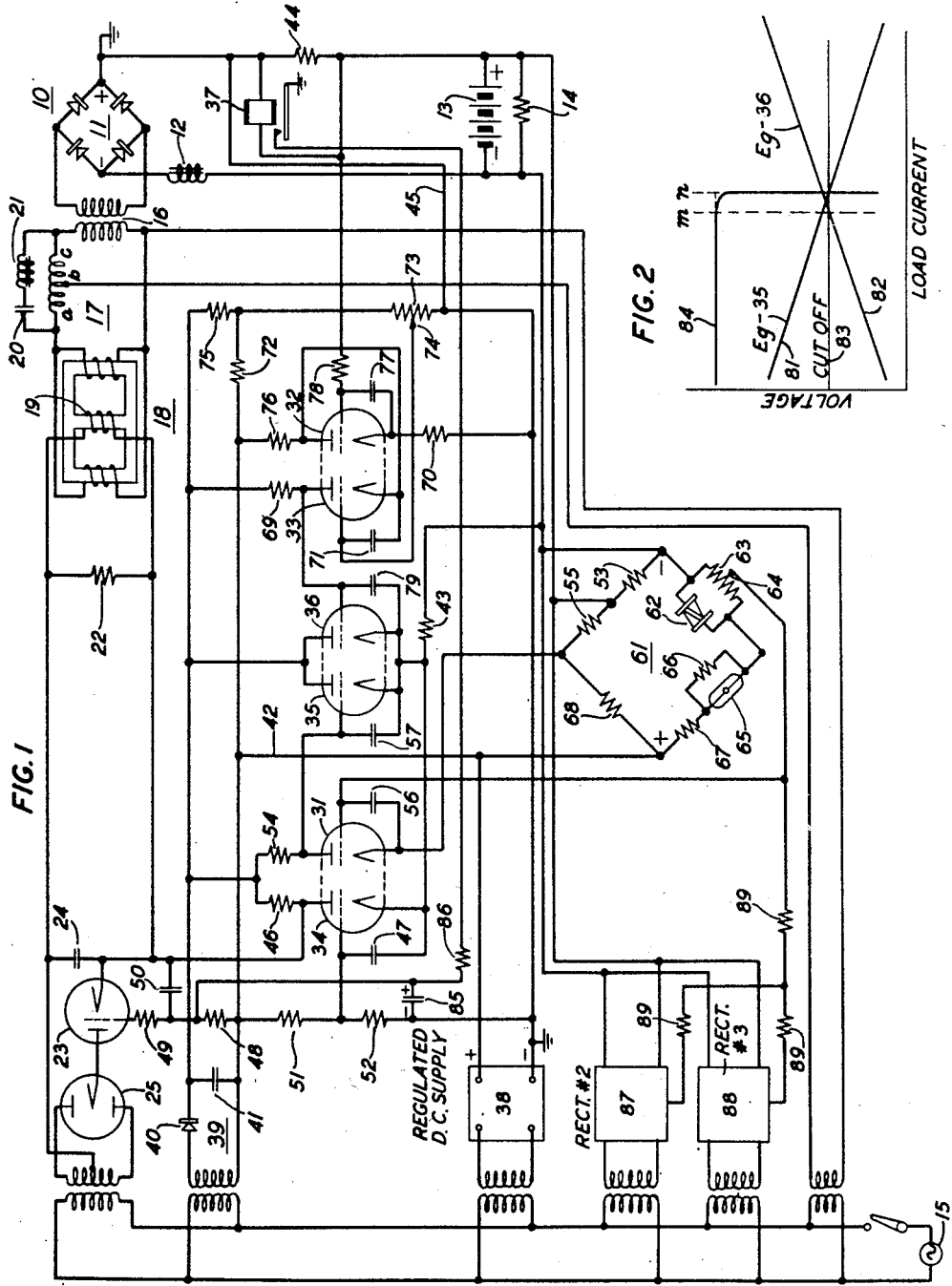
INVENTOR
J. A. POTTER
BY
H. A. Burgess
ATTORNEY Patented Aug. 7, 1951

2,563,486

UNITED STATES PATENT OFFICE 2,563,486

VOLTAGE REGULATOR

James A. Potter, Rutherford, N. J., assignor to Bell Telephone Laboratories, Incorporated, New York, N. Y., a corporation of New York Application December 24, 1949, Serial No. 134,916

20 Claims. (Cl. 321—19)

This invention relates to current and voltage regulation and particularly to regulated rectifier apparatus for supplying direct current to a load circuit. More specifically, the invention herein relates to improvements in the regulated rectifying apparatus disclosed in my copending application, Serial No. 764,490, filed July 29, 1947.

It is an object of this invention to provide improved regulating apparatus for controlling the supply of current to a load.

It is a further object of the invention to provide apparatus for regulating the current supplied to a load to minimize load voltage changes, and, when the current required for constant voltage is excessive, for regulating the current supplied to the load to minimize the load current changes.

Another object is to provide sharp and stable cut-over from voltage to current regulation, or vice versa, in such apparatus at a predetermined load current.

It is also an object to prevent excessive overloads in the event of a failure within the regulating apparatus.

It is a further object of the invention to stabilize parallel operation of regulated rectifiers.

In an illustrative embodiment of the invention herein shown and described, the circuit which supplies alternating current to a bridge type rectifier contains a saturable reactor. The output of the rectifier is regulated by controlling the current supplied to the direct current winding of the reactor. From no load to a current in the vicinity of full load the rectifier is so regulated as to maintain the load voltage constant. If the current required for constant voltage is excessive, control of the rectifier is transferred so that the load current is held constant despite further decreases in the load voltage. If there should be a failure within the regulator apparatus, further means are also provided to prevent excessive overloads.

Electronic switching means comprising a pair of triodes connected in parallel and operated jointly as a cathode follower effect the transfer from constant voltage regulation to constant current regulation. The grid voltage of one triode is caused to decrease in proportion to decreases in load voltage while the grid voltage of the other triode is caused to increase in proportion to increases in the load current. Only the space current path with the more positive grid will conduct so that by making the grid which is responsive to load voltage variations the more positive at no load, the net space current will be a function of the load voltage until the grid responsive to load current variations shall have become the more positive. The net space current of these triodes controls a regulator tube connected in series with the aforementioned circuit supplying direct current to the saturable reactor and hence controls the supply of alternating current to the rectifier. The gain of the triodes permits sharp cut-over from voltage to current regulations, or, vice versa, and, since both tubes will be conducting in the region that the control is transferred, the switching action will be stable.

If several regulated rectifiers are to be operated in parallel to supply a load, it is desirable from the standpoint of overall efficiency that they share the load equally, assuming them to be of equal power rating. At the time of installation they may be manually adjusted so as to properly share the load. Due to their extremely flat characteristics, however, a change of but a fraction of a volt, for example, due to aging of some of the component parts, may result in a change in output current of well over fifty amperes. To prevent one regulator from grabbing all of the load if its operating point should shift, the voltage control amplifiers of identical rectifiers are connected in parallel by means of relatively high impedance couplings. Variations within any one regulator are thus reflected to each of the other regulators by an amount determined by the size of the coupling resistors which causes the regulator outputs to track one another.

The invention will be more clearly understood from the following detailed description of an illustrative embodiment when read in connection with the attached drawing in which:

Fig. 1 is a schematic view of a regulated rectifier embodying the invention; and Fig. 2 shows characteristic curves of such a rectifier.

Referring now to Fig. 1, a single phase bridge rectifier 10 comprising selenium rectifying elements 11 is connected to supply current through a smoothing choke 12 to a battery 13 across which a load 14, which may vary, is connected. The choke 12 and the capacitance of the battery 13 form a filter across the rectifier output.

Power is supplied to the rectifier 10 from an alternating current source 15 through an input transformer 16. The primary winding of the transformer 16 is in series with a buck-boost auto-transformer 17 and the paralleled windings of a saturable reactor 18 having a direct current winding 19. The amount of power supplied to the rectifier is controlled by the amount of current in the saturating winding 19 in the following manner.

Series current through the *bc* winding of the auto-transformer 17 from the source 15 induces a voltage in the *ac* winding thereof which reduces the voltage across the primary winding 16 and hence "bucks" the supply of power to the rectifier. This action, however, is opposed by current from the source 15 which flows through the *ab* winding of the auto-transformer 17. This latter current induces a voltage in the *bc* winding, which adds to the voltage across the primary winding of the transformer 16 and hence "boosts" the supply of power to the rectifier.

If no current flows through the auto-transformer winding *ab* from the source 15, the voltage appearing across the primary of the transformer 16 will be equal to the voltage of the source 15 less a voltage drop due to the inductive reactance of the winding *bc*. This condition will be met at zero load when there is no current flowing in the saturating winding 19 of the reactor 18 and the voltage drop across the winding *bc* is high enough to leave only a small percentage of the source 15 voltage across the transformer 16 primary. To further reduce the selenium rectifier input voltage to zero at no load, the transformer 16 is designed to require a relatively high magnetizing current. Effectively, this results in approximately zero voltage across the secondary of the transformer 16.

As the load current increases, current through the saturating winding 19 is also caused to increase, thereby reducing the inductance and hence inductive reactance of the saturable reactor 18 to allow series current to flow through the *ab* winding of the auto-transformer 17 from the source 15. This latter current induces a current in the winding *bc* which is opposite in direction to that flowing from the source 15 through the winding *bc* and the transformer 16 primary in series and hence opposes the voltage drop due to the series current. When the induced current in the winding *bc* equals the series current therethrough, the voltage across the transformer 16 primary will equal the source 15 voltage. Further increases in the load current will result in a higher induced current in the winding *bc* so that the voltage across the transformer 16 primary will be increased above that of the source 15.

The condenser 20 and inductance 21 form a filter which is tuned to the third harmonic of the source 15 frequency and which acts to eliminate any such harmonics which may appear in the *ac* winding of the auto-transformer 17. The resistor 22 limits current which may be induced in the saturating winding 19 from voltage surges across the parallel windings of the reactor 18.

This buck-boost arrangement comprising an auto-transformer and a saturable reactor permits an important saving in iron since the input voltage may be varied both above and below the normal value of the source 15 by varying the current in the saturating winding of the reactor. If only a saturable reactor is used to control the input voltage, being connected either in series or in parallel with the power source, the input voltage can be varied only in one direction from the normal value, thus requiring a reactor of approximately twice the iron, other factors being equal.

The regulator circuits whereby the power supplied to the rectifier is controlled will now be described briefly as background for the detailed description to follow.

Current for the saturating winding 19 of the saturable reactor is supplied by the rectifying tube 25 and is controlled by the series regulating tube 23. The direct current supply is filtered by the condenser 24. The regulating circuit comprises an amplifier, called a voltage amplifier herein, comprising a space current triode 31, a second amplifier, called a current amplifier herein, comprising two space current triodes 32 and 33, a final or output amplifier comprising a space current triode 34, and an electronic switch comprising two space current triodes 35 and 36 for alternatively connecting the output of the voltage or current amplifiers to the input of the final amplifier stage. The series regulating device 23 is under the control of the final amplifier 34 and the outputs of the voltage and current amplifiers are adjusted so that at load currents below a certain value the rectifier will be operated as a constant voltage device. At higher load currents, however, the electronic switch will transfer control to the current control amplifiers so that constant current operation will be in effect. If there should be a failure within the regulator circuit, abnormal load currents will cause the relay 37 to operate. This operation of relay 37 acts to reduce the input to the rectifier 10 and hence limits the load current to a safe value.

The circuits for regulating the supply of power to the rectifier will now be described in detail. There are provided a regulated direct-current supply source 38, as is more fully disclosed in my aforementioned copending application, and an unregulated direct-current source 39 comprising the rectifier 40 and filter condenser 41. The positive terminal of the regulated supply is connected to the negative terminal of the unregulated supply by the lead 42. These sources serve as anode and filament supplies for the various space discharge devices and as sources of potential as needed in the regulating circuits. Circuits for supplying the filaments of the various tubes have not been indicated in the drawing but heating current could be supplied from the source 38 in a readily obvious manner.

The space current path for the output amplifier tube 34 may be traced from its cathode through the resistance 43 to the negative terminal of the battery 13, from the positive terminal of the battery through the resistor 44 and the lead 45 to the negative terminal of the regulated supply 38, from the positive terminal thereof through lead 42 to the negative terminal of the unregulated supply 39, and from the positive terminal thereof through resistor 46 to the anode of tube 34. A condenser 47 is connected between the control grid and cathode of the tube 34 to eliminate ripple, stray R. F. and parasitics from the grid of the tube. It will be noted that the control grid-cathode circuit of the tube 23 includes, in series, the resistor 46, the condenser 41 and the resistors 48 and 49 so that the effective resistance of the space current path of the series regulating tube 23 is controlled in response to variations in the space current of tube 34 which varies the voltage drop across resistor 46. Resistor 49 and condenser 50 cooperate as a filter to remove high frequency components from the control grid of tube 23. The fixed bias for tube 23 is equal to the difference in voltage across condenser 41 and resistors 48 and 49 and is adjusted so that at no load no current will flow through the saturating winding 19 for reasons hereinbefore described. Fixed bias for the tube 34 is supplied by a voltage divider comprising resistors 51 and 52 which are connected across the output of the regulated supply 38.

Resistor 53 is connected across the terminals of the battery 13 and is included in the space current path of tube 31 which may be traced from the positive terminal of the battery 13, through resistor 44 and lead 45 to the negative terminal of the regulated supply 38, from the positive terminal of the regulated supply to the negative terminal of the unregulated supply 39, from the positive terminal of the unregulated supply through resistor 54 to the anode of tube 31, and from the cathode thereof through resistors 55 and 53 to the negative terminal of the battery 13. A filter condenser 56 interconnetcs the control grid and cathode of the tube 31. The anode of tube 31 is directly connected to the control grid of tube 35. A control grid-cathode circuit for the tube 35 may be traced from the cathode through the resistor 43 to the negative terminal of the battery 13, from the positive terminal of the battery through resistor 44 and the lead 45 to the negative terminal of the regulated supply 38, from the positive terminal thereof to the negative terminal of the unregulated supply 39, and from the positive terminal thereof through the resistor 54 returning to the grid. Although the battery 13 is also included in the space current path of tube 35, the unamplified voltage variations of the battery have substantially no direct effect on the grid-cathode voltage of the tube. Rather, the grid voltage of tube 35 is varied in accordance with the variations of battery 13 voltage which are amplified by the tube 31 and which result in a change in voltage drop across the resistor 54. A filter condenser 57 interconnects the control grid and cathode of the tube 35.

The aforementioned resistors 53 and 55 comprise, in series, one arm of a bridge circuit 61, which has as its other arms a symmetrical varistor 62 shunted by a potentiometer 63 having a variable tap 64, a directly heated thermistor 65 shunted by a resistor 66 and in series with another resistor 67, and a resistor 68. The varistor provides a stable reference voltage across its terminals since, in its operating region, it is essentially a constant voltage device. The thermistor 65 and resistors 66 and 67 are provided to compensate for the resistance-temperature characteristic of the varistor 62 since the resistance of the varistor and hence the voltage drop across it tends to decrease with increasing ambient temperature. Therefore, if the ambient temperature should rise, for example, the resistance of the thermistor 65 decreases to cause the current through the varistor 62 to rise and thereby minimize the effect of ambient temperature changes on the voltage drop across the varistor. Any voltage variations which may occur will appear mainly across the resistor 67.

The positive terminal of the regulated supply 38 is connected to one of the bridge terminals and the opposite terminal of the bridge is connected to the negative terminal of the battery 13 so that the sum of the voltages of the battery 13 and the supply 38 appears across these two terminals. The potentiometer 63 with its variable tap 64 forms a voltage divider across the varistor 62 and is connected by way of the tap 64 to the control grid of the tube 31. The remaining terminal of the bridge is connected to the cathode of the tube 31 so that the voltage derived by the bridge circuit and impressed on the grid-cathode circuit of the voltage amplifier 31 is equal to the sum of the voltages across the resistors 55 and 53 minus as much of the voltage across the varistor 62 that appears between the adjustable tap 64 and the negative terminal of the bridge 61. Since the varistor voltage remains substantially constant with changes in current, any change in the battery 13 voltage will be reflected as a change in the grid-cathode voltage of the tube 31. Therefore, as the voltage of the battery 13 increases, for example, the voltage across the output terminals of the bridge also increases to make the control grid of the tube 31 more negative with respect to its cathode. This reduces the space current in the tube 31 and hence raises the potential of its anode, and, due to the direct connection of the anode of tube 31 and the control grid of the tube 35, this increase in anode potential results in an increase in the control grid-cathode potential of the tube 35. Thus, the grid-cathode voltage of tube 35 increases in proportion to increases in the battery 13 voltage. As will be described later, this increase in grid voltage acts to decrease the power input to the rectifier 10 and hence hold the load voltage constant.

The space current circuit for the current amplifier tube 33 may be traced from the negative terminal of the regulated supply 38 through the positive terminal thereof to the negative terminal of the unregulated supply 39, from the positive terminal of the unregulated supply through the resistor 69 to the anode of tube 33, from the cathode of tube 33 to the anode of tube 32, and from its cathode through the resistor 70 returning to the negative terminal of the regulated supply. A filter condenser 71 interconnects the grid and cathode of the tube 33. The resistor 72 and potentiometer 73 form a voltage divider across the regulated supply 38 output. This provides an adjustable reference voltage between the movable tap 74 of the potentiometer 73 and the negative terminal of the regulated supply which is applied to the control grid of tube 33. The unregulated supply 39 and the reference voltage potentiometer 73 are connected together through resistor 75. A change in the unregulated supply voltage will therefore cause a change in the grid voltage of the tube 33 in the same direction. The combined effect of these two actions is to leave the anode voltage of the tube 33 unchanged by variations in the unregulated supply.

The space current path for the tube 32 may be traced from the negative terminal of the regulated supply 38 to the positive terminal thereof, from the positive terminal through the resistor 76 to the anode of tube 32 and from the cathode thereof through the resistor 70, returning to the negative terminal of the supply 38. The resistor 70 provides negative feedback for the tube 32 and thus reduces the gain of the first stage of the current amplifier. A filter condenser 77 interconnects the grid and cathode of the tube 32. The control grid-cathode path for the tube 32 may be traced from the grid through a resistor 78 which cooperates with the filter condenser 77, through the resistor 44 and the lead 45 to the negative terminal of the regulated supply 38, and returning through the cathode resistor 70 to the cathode of the tube. The voltage variations across the resistor 44 are proportional to variations in the amplitude of the current supplied by the rectifier 10 to the battery 13 and load 14 and are thus impressed upon the grid-cathode circuit of the tube 32. The control grid-cathode circuit of the tube 33 includes, in addition to a portion of the potentiometer 73 and the resistor 72, the resistor 76; hence, load current variations detected as voltage variations by the resistor 42 are reflected in the space current of the tube 33.

The control grid of tube 36 is directly connected to the anode of tube 33 similarly to the connection of the grid of the tube 35 to the anode of tube 31. Likewise, the control grid-cathode circuit for tube 36 may be traced from the cathode through the resistor 43 to the negative terminal of battery 13, from the positive terminal through resistor 44 and lead 45 to the negative terminal of the regulated supply 38 and unregulated supply 49 to the positive terminal of the latter, and from there through the resistor 69 to return to the grid. A filter condenser 79 interconnects the grid and cathode of tube 36. And, as with tube 35, the unamplified variations of battery 13 voltage have substantially no direct effect on the grid voltage of tube 36 since the battery 13 is included in both the space current and grid-cathode paths of the tube. The space current of tube 36 will, therefore, be varied in accordance with the variations in the space current of tube 33, with increase in the latter causing a decrease in the grid-cathode voltage of tube 36 and vice versa. It may thus be seen that as the load current increases, for example, the voltage drop across the resistor 44 will increase making the grid of tube 32 more negative with respect to its cathode. This will decrease the space current in the tube 32 and increase the potential of its anode. Consequently, the grid of tube 33 will become more negative with respect to its cathode and cause a decrease in the space current of tube 33. This decrease in space current will decrease the voltage drop across resistor 69 and hence increase the grid-cathode voltage of tube 36. As will be described later, this increase in grid voltage will act to decrease the power input to the rectifier 10 and hence prevent further increases in load current.

It has now been described how an increase in battery 13 voltage drives the grid of tube 35 more positive with respect to its cathode and how an increase in the load current results in an increase of the grid-cathode voltage of the tube 36. Opposite trends in load voltage and current will, of course, drive the respective grids more negative. It will now be described how these grid voltages operate to transfer control of the rectifier from the voltage amplifier 31 to the current amplifier 32—33 if the current required to maintain the load voltage constant becomes excessive.

The tubes 35 and 36 are connected in parallel and the common portion of their space current paths may be traced from their common cathode connection through a common cathode resistor 43 to the negative terminal of the battery 13, from the positive terminal of battery 13 through the resistor 44 and lead 45 to the negative terminal of the regulated supply 38, from the positive terminal of the regulated supply to the negative terminal of the unregulated supply 39, and from the positive terminal of the unregulated supply to their common anode connection.

The common cathode resistor 43 is included in the grid-cathode circuit of the tube 34 which may be further traced through battery 13, resistor 44 and lead 45 to the negative terminal of the regulated supply 38 and from there through resistor 52 to the grid of tube 34. Variations in the net space current of the paralleled tubes 35 and 36 are amplified by the tube 34 which, as previously described, controls the resistance of the space current path of the series regulator tube 23.

An increase in the current through the resistor 43, for example, due to an increase in the grid potential of either tube 35 or 36 will increase the voltage drop across resistor 43 and hence decrease the grid-cathode potential of tube 34. This decrease in grid potential will decrease the space current in tube 34 and hence decrease the voltage drop across resistor 44 and make the cathode of tube 23 more positive with respect to its grid. This increases the resistance of the space current path of tube 23 and decreases the current in the saturating winding 19 of the saturable reactor. As explained hereinbefore, a decrease in saturating current will decrease the boosting action of the autotransformer and effect a decrease in the voltage input to the rectifier 10. Decreases in the grid voltages of either tubes 35 or 36 will result in increased saturating current and hence increased power input to the rectifier 10.

The tubes 35 and 36 are connected to operate jointly as a cathode-follower, and form an electronic switch which acts to alternatively connect the voltage amplifier 31 or the current amplifier 32—33 to the final amplifier 34. The anodes of tubes 35 and 36 are connected to the positive side of the unregulated supply 39 while the common cathode resistor 43 is connected to the negative terminal of the battery 13. At no load the control grid of tube 35 is much more positive than the control grid of tube 36 with respect to their common cathode connection. The resultant space current flowing through cathode resistor 43 raises the potentials of the cathodes of tubes 35 and 36 to a level where the tube 36 is cut off. Thus, only the voltage amplifier 31 is connected to the final amplifier 34 and space current variations in the current control amplifier 32—33 will have no effect on the rectifier input. The rectifier 10, therefore, is under constant voltage regulation.

As the load increases, the load voltage will tend to decrease which drives the control grid of tube 35 more negative and results in an increase of the power input to the rectifier 10 as previously described. At the same time the increased current flowing to the load through the resistor 44 drives the grid of tube 36 more positive. At a load current predetermined by the settings of the potentiometers 73 and 63, the combined effects of the cathodes of tubes 35 and 36 becoming less positive due to decreased plate current and the grid of tube 36 becoming more positive due to increased load current causes the tube 36 to begin to conduct. As the load current continues to increase, the grid voltage of tube 36 will also continue to increase and the increasing space current will again tend to drive the cathodes more positive. At the same time, due to the decreasing load voltage, the grid voltage of tube 35 continues to decrease so that these combined effects will cut off space current in the tube 35. The voltage amplifier 31 is therefore disconnected from the final amplifier 34 and the current amplifier 32—33 alone remains connected thereto, placing rectifier 10 under constant current regulation. Further tendencies of the load current to increase will result in decreasing the power input to the rectifier 10 as previously described so that the load current will be maintained constant at a value substantially equal to the load current at which the tube 35 becomes cut off.

The action just described may be better understood by referring to the illustrative and generally self-explanatory curves of Fig. 2 wherein curves 81 and 82 represent, respectively, the grid-cathode voltage of tubes 35 and 36, the horizontal line 83 representing the cut-off grid-cathode voltage of tubes 35 and 36, and the curve 84 represents the regulator characteristic.

There will be a certain range of load currents during which both tubes 35 and 36 will conduct. This produces the knee of the regulator characteristic as shown between the dotted lines $m$ and $n$ in Fig. 2 and provides for stable switching. Due to the gain of the two triodes, their relative impedances are kept high so that cut-over from voltage to current regulation or vice versa will be sharp. During the cut-over period both the current and the voltage amplifiers exercise control over current flowing through the cathode resistor 43 in varying amounts and hence jointly control the rectifier input. In addition to their action as an electronic switch, the tubes 35 and 36 each amplify the signals impressed on their grids by their respective control amplifiers with the resistor 43 furnishing negative feedback.

In review, current supplied to the saturating winding 19 of the reactor 18 is controlled by the final amplifier 34 in response to load voltage variations unless the load current should increase sufficiently to cause the electronic switch 35—36 to disconnect the voltage amplifier 31 from the final amplifier 34 and connect the current amplifier 32—33 thereto. The saturating current would then be controlled in response to load current variations.

In the event of a failure within the regulating circuit, there is provided overload protection comprising the relay 37, condenser 85 and the resistor 86. The fixed grid bias of the series regulating tube 23, which is supplied from the negative terminal of the unregulated supply 39 through the resistor 48, also serves to charge the condenser 85 with a polarity as indicated in the figure. The relay 37 has its winding connected across the resistor 44 and is adjusted to operate at a predetermined safe maximum load current. When operated, the relay permits the condenser 85 to discharge through the resistor 86 and its contact and armature to ground. This discharge causes a rapid and drastic decrease of the grid potential of tube 23 to a degree that overcomes any abnormal output of the final amplifier 34, and causes a reduction in the rectifier 10 input by reducing the current through the saturated winding 19. This action will be intermittent as long as the overload condition persists and will occur at a rate determined by the charging and discharging time of the condenser 85.

There are also provided as shown in Fig. 1 two regulated rectifiers 87 and 88 similar to the one shown and described in detail. The outputs of these three rectifiers are connected in parallel to supply current to the battery 13 and load 14. As previously mentioned, the regulators of the parallel rectifiers are interconnected by relatively high impedance resistance coupling between the voltage amplifiers of the identical rectifiers. As illustrated, this coupling comprises the three resistors 89 which directly connect the control grids of the voltage amplifiers 31 in the several regulators. Alternatively, or, in addition, the cathodes and anodes thereof may be coupled in a similar manner. Variations within any one regulator are thus reflected to each of the others by an amount dependent on the size of the resistors 89 so that if the rectifiers are initially adjusted to properly share the load, they will continue to do so in spite of any such variations. The size of these resistors must be low enough to keep the output currents in reasonable balance, yet high enough so that a failure of one rectifier or regulator circuit will not feed back too great a reflection to the other regulators and thus induce hunting.

Although the invention has been described in detail as relating to a specific illustrative embodiment, other embodiments will readily occur to one skilled in the part without departing from the spirit and scope of the invention.

What is claimed is:

1. A system for supplying direct current to a load comprising a rectifier having an input and an output, variable means connected to said rectifier for supplying alternating current thereto, regulating means for said rectifier comprising means to derive a first voltage which varies in accordance with the voltage of said load, means to derive a second voltage which varies in accordance with the load current of said rectifier, means controlled in response to said first voltage to control said variable means, and switching means to transfer control of said variable means from said first voltage to said second voltage comprising a pair of space current paths connected in parallel and a control electrode in each of said paths to vary the space current therein.

2. A system for supplying direct current to a load which comprises a plurality of rectifiers and regulators according to claim 1, means connecting the outputs of said rectifiers in parallel to supply said load, and impedance means coupling the said first voltage derivation means of each of said rectifiers, each with the other.

3. The combination according to claim 1 and means to apply said first voltage to one of said control electrodes and means to apply said second voltage to the other of said control electrodes.

4. The combination according to claim 3 wherein said variable means are controlled in response to the net space current of said parallel paths.

5. The combination in a regulated rectifier connected to supply direct current from a power source to a load of a first and a second space discharge device, means connected to said first device to control the space current therein in accordance with the voltage of said load, means connected to said second device to control the space current therein in accordance with the load current of said rectifier, means controlled by the space current of said first device to regulate the power input of said rectifier, and switching means to transfer control of said last-named means from the space current of said first device to the space current of said second device at a predetermined load current comprising a pair of space current paths connected in parallel and a control electrode in each of said paths to control the space current therein.

6. A system for supplying direct current to a load which comprises a plurality of regulated rectifiers according to claim 5, means to connect the outputs of said rectifiers in parallel to supply said load, and impedance means which couple the said first space discharge devices of each of said regulators, each with the other.

7. The combination according to claim 5 and means to impress on one of said control electrodes a voltage varying in accordance with the space current of said first device and means to impress on the other of said control electrodes a voltage varying in accordance with the space current of said second device.

8. In combination, means for rectifying alternating current supplied thereto and for supplying the rectified current to a load, means for supplying alternating current to said rectifier, and regulator means for said rectifier comprising a first space discharge device whose space current is responsive to variations in the voltage of said load, a second space discharge device whose space current is responsive to the output current of said rectifier, variable means controlled by said voltage responsive space discharge device for regulating the input to said rectifier, and switching means adapted to transfer control of said input regulating means from said voltage responsive device to said current responsive device if the said output current should increase beyond a predetermined value comprising a space current path having two control electrodes, an anode, and a cathode, means to control the voltage on one of said control electrodes with respect to said cathode by the space current of said voltage responsive device and means to control the voltage of the other of said control electrodes with respect to said cathode by the space current of said current responsive device.

9. The combination according to claim 8 wherein said variable means are controlled by the current flowing in said space current path.

10. A system for supplying direct current to a load which comprises a plurality of said first mentioned means each connected to a said load and regulator means for each of said first mentioned means according to claim 8, and impedance means connecting the said first space discharge devices of each of said regulator means each with the other.

11. The combination in a regulated rectifier whose output is connected to supply a load of a first space discharge device whose space current is caused to vary in accordance with the voltage of said load, a second space discharge device whose space current is caused to vary in accordance with the load current of said rectifier, variable means to supply alternating current to said rectifier, said variable means under control of the space current of said first space discharge device, and means to transfer control of said variable means from the space current of said first space discharge device to said second space discharge device comprising a pair of space discharge devices, each having an anode, a cathode, and a control electrode, connected in parallel between said first and second space discharge devices and said variable means.

12. A system for supplying direct current to a load comprising a plurality of regulated rectifiers according to claim 11, means connecting the outputs of said rectifiers in parallel to supply said load, and means comprising an impedance to couple the said first space discharge devices of the said plurality of regulators each with the other.

13. The combination according to claim 11 and means to impress on one of said control electrodes with respect to its associated cathode a voltage varying in accordance with the space current of said first space discharge device and means to impress on the other of said control electrodes with respect to its associated cathode a voltage varying in accordance with the space current of second space discharge device.

14. The combination in accordance with claim 11, a resistance in series with said parallel space discharge devices, and said variable means connected to said resistance to derive a control voltage therefrom.

15. In combination, means for rectifying alternating current supplied thereto, and for supplying the rectified current to a load, variable means for supplying alternating current to said rectifier, regulating means for said rectifier comprising a first space discharge device, means to cause the space current of said first device to vary in accordance with the voltage of said load, a second space discharge device, means to vary the space current of said second device in accordance with the rectified current of said rectifier, a third and a fourth space discharge device each having an anode, a cathode and a control electrode, means connecting said anodes to each other and means connecting said cathodes to each other, means to derive a voltage which varies in accordance with the space current of said first device and to impress said voltage on the control electrode of said third space discharge device with respect to its cathode, means to derive a voltage which varies in accordance with the space current of said second space discharge device and to impress said voltage on the control electrode of said fourth device with respect to its cathode, a resistance in series with the parallel combination of said third and fourth space discharge devices, and means connecting said variable means to said resistance to derive a control voltage therefrom.

16. A system for supplying direct current to a load comprising a plurality of regulated rectifiers according to claim 15, means connecting the outputs of said rectifiers in parallel to supply said load, and means comprising an impedance to couple the said first space discharge devices of the said plurality of regulators, each with the other.

17. A system for supplying direct current to a load comprising a plurality of rectifiers each having an input and an output, means connecting said outputs in parallel for supplying said load, variable means for supplying alternating current to each of said inputs, voltage responsive means for each of said rectifiers which derive a voltage varying in accordance with the voltage of said load, means comprising the said derived voltage to control the said variable means, and impedance means inter-connecting the said voltage responsive means each with the other.

18. In combination, means for rectifying alternating current supplied thereto and for supplying the rectified current to a load, means for supplying alternating current to said rectifier, a saturable reactor connected in said alternating current supply circuit, said saturable reactor having a saturating winding, a space current device having at least a plate, a cathode and a pair of control electrodes, means to derive a first voltage responsive to the voltage of said load, means for deriving a second voltage responsive to said rectified current, means to impress said first voltage on one of said control electrodes with respect to said cathode, means to impress said second voltage on the other of said control electrodes with respect to said cathode, a source of direct current, and means under control of the space current in said space current device for supplying current from said direct-current source to said saturating winding.

19. In combination, means for rectifying alternating current supplied thereto and for supplying the rectified current to a load, a source of alternating current, variable means for supplying current from said source to said rectifier, a first space current path comprising a plate, a cathode and a control electrode, a second similar space current path connected in parallel therewith, means to derive a first voltage proportional to the output voltage of said rectifier, means to derive a second voltage proportional to the said rectified current, means comprising said first voltage for controlling the current in said first space current path, means comprising said second voltage for controlling the current in said second space current path, and said variable means controlled by the net space current of said parallel paths.

20. In a system for supplying rectified current to a load comprising a source of alternating current, rectifying means and variable means for supplying current from said source to said rectifier, a pair of space current devices connected in parallel, control electrodes in each of said devices for controlling the space current therein, means to impress on one of said electrodes a voltage varying in accordance with the output voltage of said rectifier, means to impress on the other of said electrodes a voltage varying in accordance with the output current of said rectifier, and means to control said variable means by the net space current of said space current devices.

JAMES A. POTTER.

REFERENCES CITED

The following references are of record in the file of this patent:

UNITED STATES PATENTS

| Number | Name | Date |
|---|---|---|
| 2,128,771 | Forssell et al. | Aug. 30, 1938 |
| 2,331,131 | Moyer | Oct. 5, 1943 |
| 2,331,411 | Milarta | Oct. 12, 1943 |
| 2,413,941 | Bixby | Jan. 7, 1947 |